United States Patent
Silva et al.

(10) Patent No.: US 11,567,165 B1
(45) Date of Patent: Jan. 31, 2023

(54) SYSTEM FOR EFFICIENTLY TRACKING EQUIPMENT

(71) Applicant: Momentum IoT, Inc., Long Beach, CA (US)

(72) Inventors: Justin Silva, Long Beach, CA (US); Steve Durana, Long Beach, CA (US); Dustin Holtz, Long Beach, CA (US); Lars Rosenblad, Long Beach, CA (US)

(73) Assignee: Momentum IOT, Inc., Long Beach, CA (US)

( * ) Notice: Subject to any disclaimer, the term of this patent is extended or adjusted under 35 U.S.C. 154(b) by 0 days.

(21) Appl. No.: 17/708,605

(22) Filed: Mar. 30, 2022

(51) Int. Cl.
*H04W 24/00* (2009.01)
*G01S 5/02* (2010.01)
*H04W 64/00* (2009.01)

(52) U.S. Cl.
CPC ....... *G01S 5/02585* (2020.05); *H04W 64/006* (2013.01)

(58) Field of Classification Search
CPC .................. G01S 5/02585; H04W 64/006
See application file for complete search history.

(56) References Cited

U.S. PATENT DOCUMENTS

| | | | |
|---|---|---|---|
| 2017/0332330 A1* | 11/2017 | Dhandu | H04W 4/70 |
| 2019/0075518 A1* | 3/2019 | Ganton | H04W 64/006 |
| 2020/0137181 A1* | 4/2020 | Connelly | H04W 4/023 |
| 2021/0173399 A1* | 6/2021 | Richard | B60W 40/12 |

* cited by examiner

*Primary Examiner* — Justin Y Lee
(74) *Attorney, Agent, or Firm* — Smyrski Law Group, a P.C.

(57) ABSTRACT

A system is provided that includes a tracking device having a tracking device accelerometer, the tracking device associated with a tracked hardware device, and a base transmitter/receiver having a base transmitter/receiver accelerometer and configured to poll and receive tracking device accelerometer data from the tracking device. The base transmitter/receiver is associated with and transportable by a vehicle and the tracking device and tracked device are positionable within the vehicle. Differences in movements of the vehicle when housing the base transmitter/receiver, the tracking device, and the tracked hardware device produce communication functionality differences between the base transmitter/receiver and the tracking device.

20 Claims, 8 Drawing Sheets

SYSTEM FOR EFFICIENTLY TRACKING EQUIPMENT

BACKGROUND OF THE INVENTION

Field of the Invention

The present invention relates generally to tracking systems, and more specifically to the efficient tracking and usage data collection for various types of equipment.

Description of the Related Art

Tracking functionality for large equipment and small devices, such as smartphones, are widely available (Tile, SmartTag, AirTag, etc.). For large items, users can place GPS tracking devices on or with, for example, vehicles, palettes containing expensive items, and other large articles. The ability for a user to track keys and other small items is generally available. However, cost effective tracking solutions for items that are neither small nor large are relatively rare. Certain tracking devices can offer some functionality, but the operation of such devices can be limited and may not provide all the information desired based on the requirements for the device tracked.

For example, in areas such as construction, a worker may have a set of equipment he or she maintains and regularly transports to a job site. Mid-sized equipment such as ladders, lawn mowers, power tools, precision tools, and so forth are typically not tracked and can sometimes be misplaced or stolen. Once misplaced or stolen, that piece of equipment is typically permanently missing and must be replaced, frequently at significant cost.

Additionally, actual use of such equipment cannot be tracked or assessed. A worker may say he or she is going to a job site when in fact he or she does other things unrelated to his or her employment. Workers may claim to be using a piece of equipment or performing a job in a certain way when in fact they are not using an appropriate tool for the job. A supervisor may complain that a worker never checked the roof installation where the worker says he used his ladder to climb up on the roof, when in fact he did not remove his ladder from his vehicle. Further, certain tools have maintenance schedules and need servicing based on use, and such usage statistics can either be estimated or can require the recollection of the user or users, which can be less than ideal.

Additionally, existing tracking systems require power and communication abilities. When a device is always communicating, it tends to drain its power source, such as a battery, and a loss of power in a tracking device can be problematic. Further, many networks establish communications between nodes or devices on the network and communicate constantly between devices in situations where in reality no or minimal communication is needed. Inefficient communications can cause slowdowns, unnecessary use of and potentially loss of power in the tracking hardware and are generally undesirable.

It would be beneficial to offer a system and system functionality that would cost efficiently and effectively offer users the ability to track equipment and generally medium sized items that provides efficiencies in processing, network, and system wide operation.

SUMMARY OF THE INVENTION

Thus according to one embodiment, there is provided a system for tracking a tracked device, comprising a tracking device comprising a tracking device accelerometer, the tracking device associated with the tracked device and a base transmitter/receiver comprising a base transmitter/receiver accelerometer and configured to poll and receive tracking device accelerometer data from the tracking device. The base transmitter/receiver is associated with and transportable by a movable vehicle and the tracking device and tracked device are positionable within the movable vehicle. Communication between the base transmitter/receiver and tracking device changes frequency based on movement of the movable vehicle when the base transmitter/receiver and the tracking device are located in the movable vehicle.

According to a further embodiment of the present design, there is provided a system comprising a tracking device comprising a tracking device accelerometer, the tracking device associated with a tracked hardware device and a base transmitter/receiver comprising a base transmitter/receiver accelerometer and configured to poll and receive tracking device accelerometer data from the tracking device. The base transmitter/receiver is associated with and transportable by a movable vehicle and the tracking device and tracked device are positionable within the movable vehicle. Differences in movements of the movable vehicle when housing the base transmitter/receiver, the tracking device, and the tracked hardware device produce communication functionality differences between the base transmitter/receiver and the tracking device.

According to a further embodiment, there is provided a tracking system comprising a tracking device comprising a tracking device accelerometer, the tracking device associated with a tracked hardware device, and a base transmitter/receiver comprising a base transmitter/receiver accelerometer and configured to poll and receive tracking device accelerometer data from the tracking device. The base transmitter/receiver is associated with and transportable by a vehicle and the tracking device and tracked device are positionable within the vehicle. Differences in movements of the vehicle when housing the base transmitter/receiver, the tracking device, and the tracked hardware device result in differences in at least one of frequency and content of communications between the base transmitter/receiver and the tracking device.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

Figure 1:
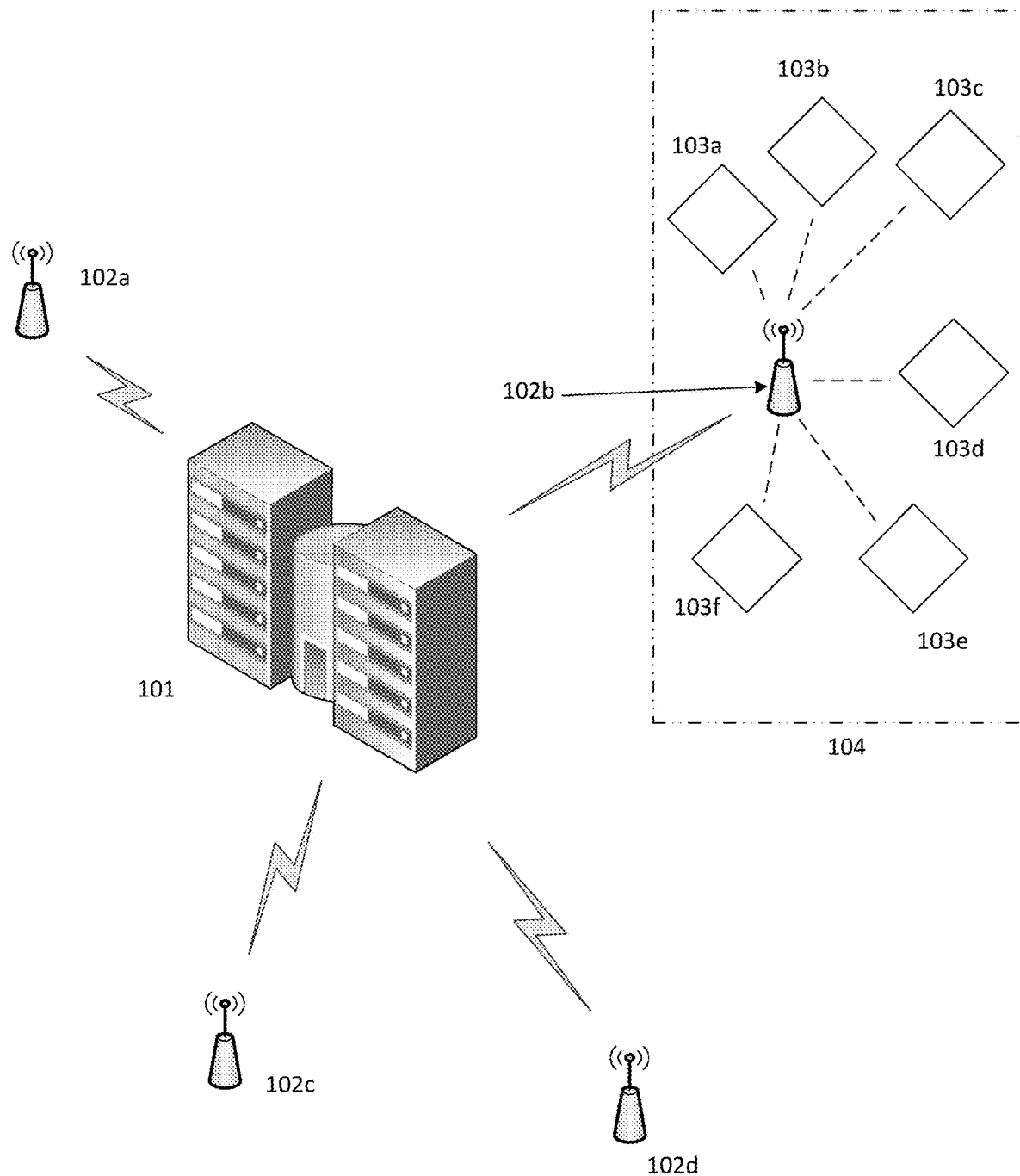
FIG. 1 is a general overview of an embodiment of the present system.

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design is a system that offers the ability to track generally medium sized equipment, but any type of item requiring tracking may benefit from the design. In one embodiment, the tracked item is a tool or apparatus used in the construction or maintenance industries, including but not limited to a power tool, ladder, gardening tool, generator, precision tool, container of product, or virtually any type of item. As disclosed herein, the term "tracked hardware item" is used to denote the item being tracked, which may be any appropriate item included in the foregoing listing or otherwise. The present design calls for providing a Tracking Device (TD) with the tracked hardware item and an associated Base Transmitter/Receiver (BTR) that is typically located with a vehicle but may be located essentially anywhere. The BTR may be positioned proximate the location where the tool is typically stored or maintained. The TD is typically attached in some manner to the tracked hardware item using an attachment method known in the art and appropriate for the tracked hardware item.

Such a system offers an ability for a user or authorized individual to obtain data related to the actual usage of the item being tracked and provides significant advantages over designs previously available.

Each TD and each BTR includes an accelerometer as well as transmission hardware and functionality. Each BTR also includes reception hardware, and a TD may include reception hardware.

The system may employ a series of BTRs, each selectively receiving data from associated TDs attached to tracked hardware items. Each BTR determines relevant information and transmits the relevant information at an appropriate time to a central processing station. The central processing station may report relevant information to appropriate entities, including the users of the tracked hardware items, supervisors and other personnel having authorized access. Note that in one embodiment, if nothing is occurring based on accelerometer readings in a BTR, such as no movement sensed because the device is not moving, even though the BTR would normally seek data from associated TDs, the system may not cause the BTR to poll its associated TDs. Further, if a TD is proximate two or more BTRs, the system may determine the BTR receiving a strongest signal from the TD and indicate other BTRs are not to poll or track the TD until further notice. The system generally knows the location of each TD and each BTR at any given time. Thus the system seeks to intelligently monitor and report information relevant to system operation rather than on a continuous fixed schedule. Such functionality is generally termed orchestration herein.

The system further provides the ability to report usage of the various tracked hardware items in the system. Tracking includes knowing, based on accelerometer readings from both the TD attached to each tracked hardware item and each BTR, the location of each relevant device in the network and its movement and usage. The system can assess perceived actual usage of the tracked hardware item based on these readings. As may be appreciated, movement of a TD outside the range of its associated BTR based on accelerometer readings indicates the tracked hardware item is being used. If the BTR is not moving and the tracked hardware item is not moving, the tracked hardware item is not being used. Such usage is reported to the central processing station and made available to personnel having authorized access to the information. Tracking of actual use provides benefits over previous tracking methods in construction and maintenance fields in that previous designs had employed transportation time to a task would typically assume usage of the tracked hardware item when in fact such item may not have been used in the task undertaken.

FIG. 1 illustrates a general overall view of the present system. From FIG. 1, central processing station 101 is communicatively coupled to BTRs 102a-d, which may each be communicatively coupled to one or more TDs. In FIG. 1, TDs 103a-f represent six TDs communicatively coupled to BTR 102b. More or fewer of any of the items represented in FIG. 1 may be employed, and central processing station 101 may communicate with more or fewer BTRs, and BTRs 102a, 102c and 102d are not shown with associated TDs for clarity of illustration, but at least one TD and in most instances multiple TDs are typically associated with each operational BTR. Element 104 generically represents a vehicle, such as a truck in transit or on a trip, housing BTR 102b and the TDs 103a-f. In one example, TD 103a may be attached to a ladder on vehicle 104, TD 103b may be attached to a lawn mower in vehicle 104, and so forth.

Figure 2:
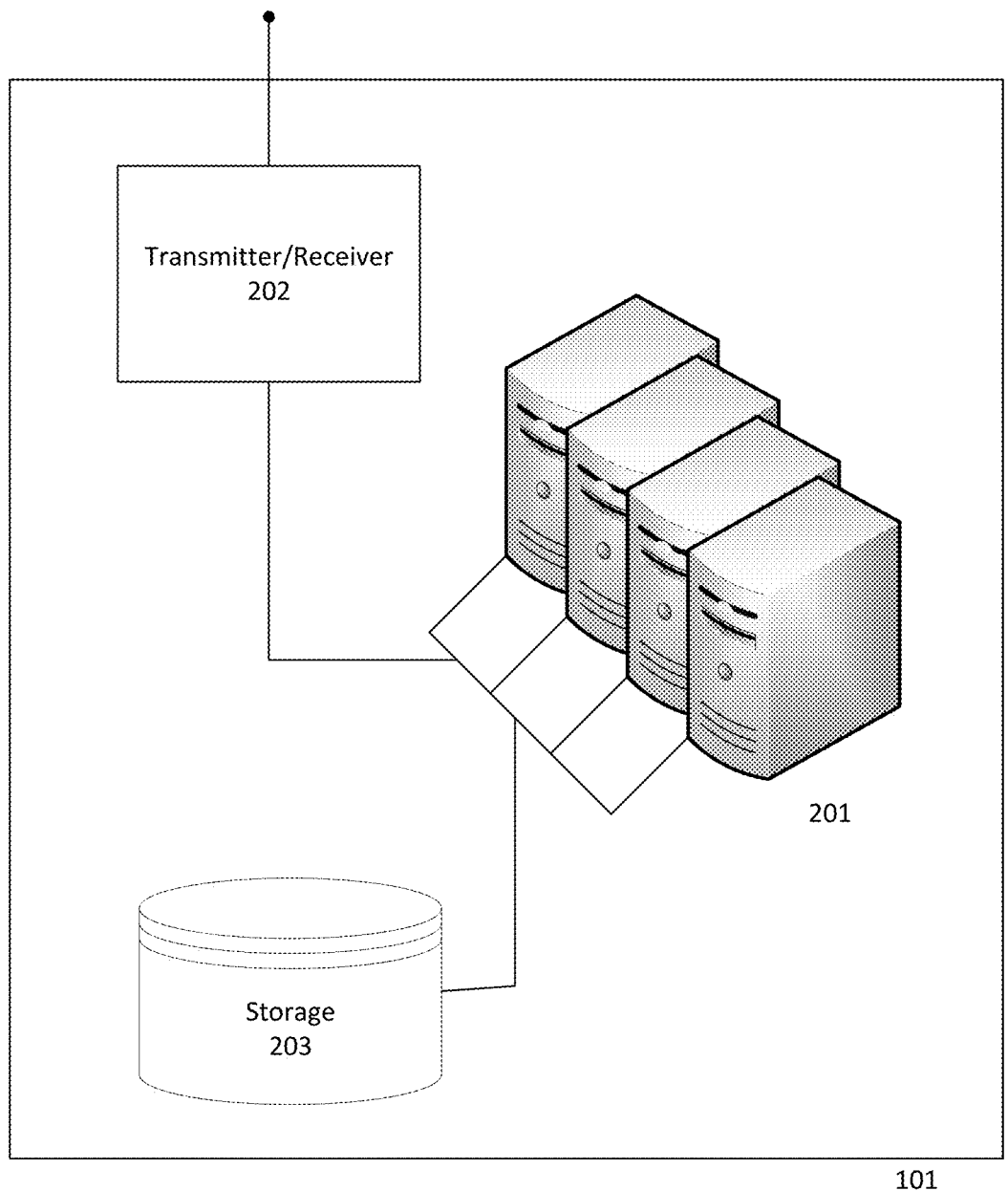
FIG. 2 illustrates an embodiment of a central processing station.

FIG. 2 illustrates an embodiment of central processing station 101, typically comprising a server arrangement such as server arrangement 201, which may include storage units, databases, and other hardware and software to effectuate the tracking of tracked hardware items. Central processing station 101 transmitter/receiver 202 is shown, and storage element 203 may store information related to the operation described herein. Central processing station 101 transmitter/receiver 202 may provide data updates to an external transmission network, such as a cellular or internet network that allows transmission of data and data updates to users operating a computing device such as a personal computer or smartphone. Alternately, the central processing station 101 transmitter/receiver may provide data directly to a network, such as the internet, wherein the information may be processed for transmission over particular networks and ultimately wherein authorized personnel and/or entities can obtain the relevant information.

Figure 3:
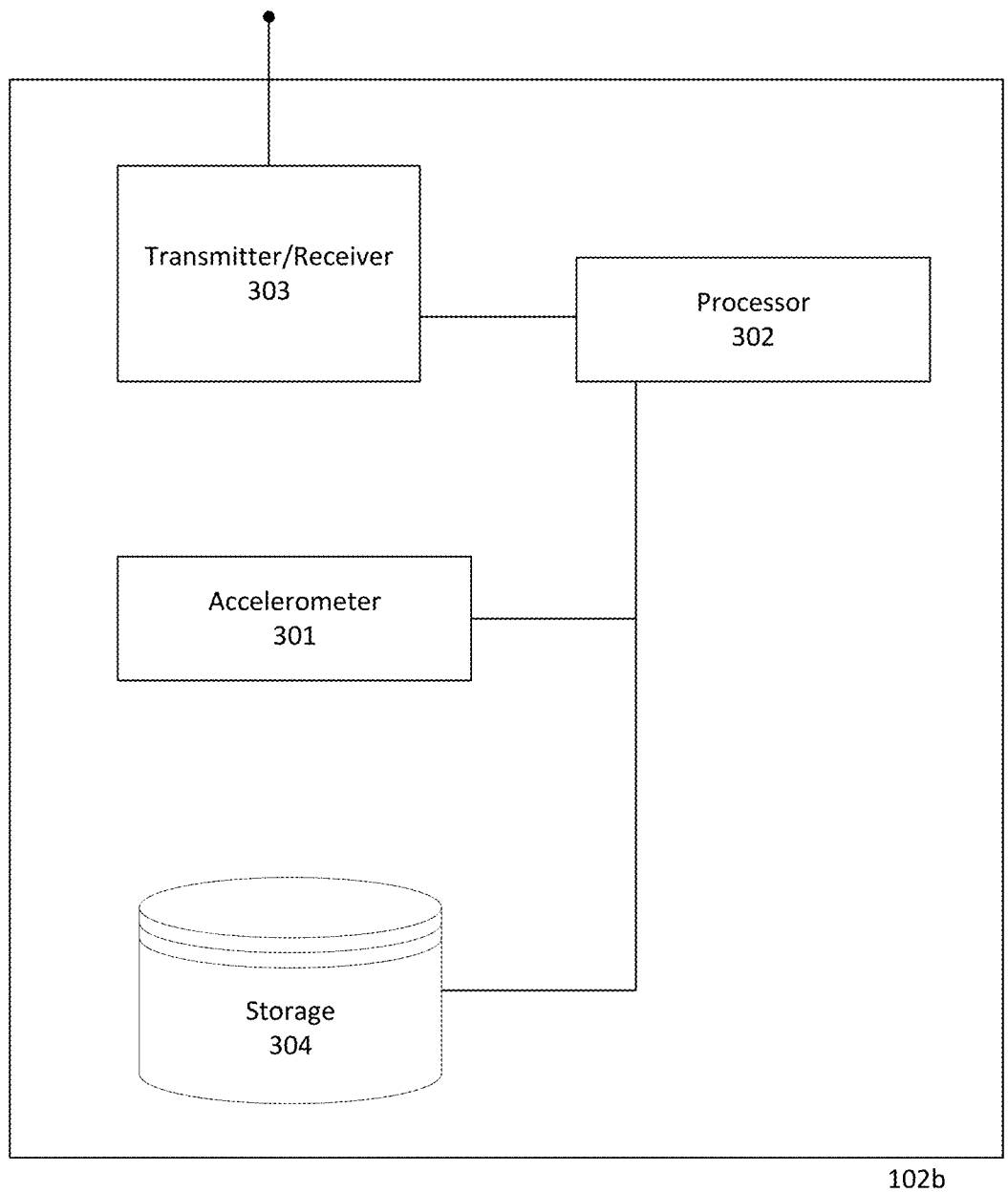
FIG. 3 shows an embodiment of a base transmitter/receiver.

FIG. 3 is a representation of an embodiment of principal components of a BTR, such as BTR 102b. Accelerometer 301 is provided with processor 302 and transmitter/receiver 303. Storage element 304 is also provided. In operation, in general, the BTR 102b generally polls associated TDs and receives information back from the associated TDs on an as-needed basis using instructions provided by processor 302. Communication may be, in one embodiment, via Bluetooth or other applicable communication medium. Additionally, BTR 102b may transmit over the same or different communication network or protocol to the associated central processing station 101 as transmission to associated TDs.

Figure 4:
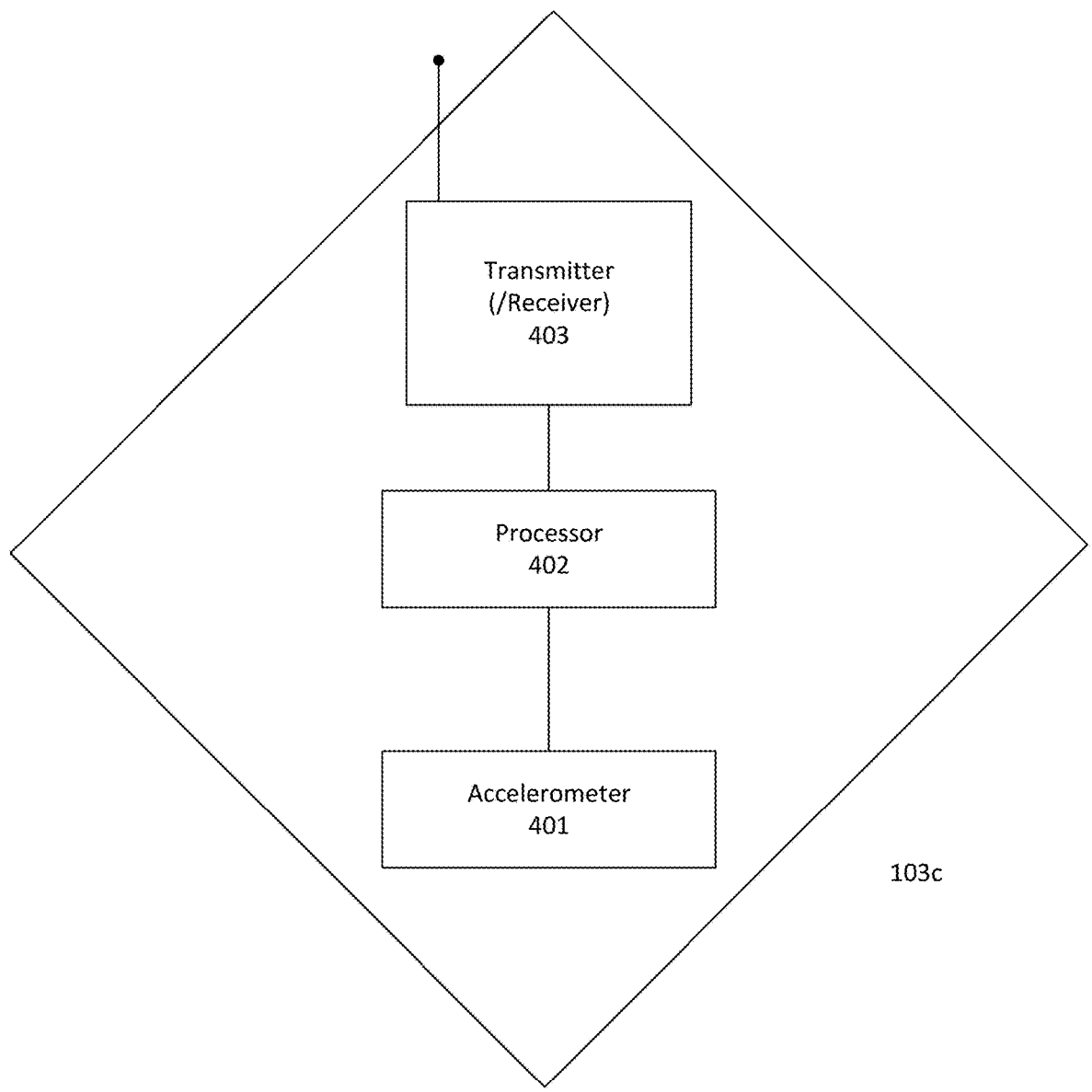
FIG. 4 represents an embodiment of a tracking device.

FIG. 4 is a representation of an embodiment of the principal components of a TD, such as TD 103c. From FIG. 4, TD 103c includes accelerometer 401, processor 402, and transmitter 403, and may include storage if desired. In most scenarios, transmission of data is one way, from TD 103c to an associated BTR 102b. The processor 402 may collect readings for accelerometer 401 and may transmit the readings to the associated BTR 102b as required. Receiving capability may be provided, such as receiving a query indication from the associated BTR 102b, wherein transmitter 403 may optionally comprise a transmitter/receiver.

While certain hardware elements in the present Figures are depicted as single discrete elements, such elements may comprise multiple components and/or may be provided in a single piece of hardware as long as the functions called for herein are performed as suggested. Further, components in for example FIGS. 1-4 and associated functionality may be implemented in hardware, software, firmware, or any combination thereof. Further, the following discussion includes reference to central processing station 101, BTR 102b, and TD 103c, but these are intended to facilitate understanding and not intended to be limiting to one such device. in operation, multiple such devices may be operating and the functionality disclosed herein may apply to all similar devices in the network.

The present design effectively and efficiently manages communications to minimize traffic over the communication channels and require as little power as needed. To that end, for example, the BTR 102b may only initiate communications over the network, such as via Bluetooth, with one or more TDs when appropriate. Typical Bluetooth communication provides an "always on" transmission, which is an unnecessary use of power.

A typical scenario for the present design is one in which a worker with a set of tools is deployed to perform certain functions at a work site. The worker has necessary tools in his vehicle and drives to the job site. The vehicle typically includes a BTR 102b mounted to the vehicle that is not moved. However, if desired, the BTR 102b may be movable. At the job site, the worker may use different tools at different times, and use of those tools, or tracked hardware items, may be in or out of range of the BTR 102b. For a tracked hardware item that goes out of range of the BTR 102b, the BTR 102b may collect accelerometer data from the associated TD 103c when the TD 103c and tracked hardware item are back in range. Such functionality can be particularly useful when the tracked hardware item is used sparingly while out of range of the BTR 102b to understand actual usage. In one embodiment, the TD 103c therefore maintains a memory and stores accelerometer readings in the memory, and may include a processor or other hardware. Such a TD 103c may report accelerometer readings to a BTR 102b when desired, such as when back in range, when polled by the BTR 102b, or otherwise.

Data collected at the BTR 102b may be judiciously transmitted to a central processing station in various desired ways. In some circumstances data may be needed and collected at high frequencies, while on other instances data collection may be less necessary and therefore less frequent. In one embodiment, the base transmitter/accelerometer may sense movement, such as driving of a vehicle, based on expected accelerometer readings and also senses when the device is stationary, such as in a parked vehicle where minimal accelerometer readings are sensed. In this manner, the BTR 102b senses when a vehicle is in transit and when the vehicle is parked. When in transit, the BTR 102b may not transmit readings to the central processing station 101 other than location data, such as GPS location, which may then be mapped by the central processing station 101 or other entity and transmitted to authorized end users or authorized entities. Further, when the BTR 102b passes an appropriate geofence, the transmission may cease or initiate depending on whether the BTR 102b is inside or outside the geofenced area. As noted, a TD 103c outside the range of the associated BTR 102b may cause the BTR 102b not to poll or receive information from the TD.

Communication between a TD 103c and BTR 102b may be over a communication network that may only operate on an as needed or aperiodic rate. For example, if the BTR 102b is at rest based on accelerometer readings, communication transmission may not take place. In one example, Bluetooth communication may be employed between the BTR 102b and all associated TDs. While Bluetooth is typically "always on," the system may cause the Bluetooth connection(s) to be off while the BTR 102b is at rest, based on accelerometer readings. Communications between the central processing station 101 and associated BTRs may also cease during times of inactivity or may be limited and/or aperiodic to conserve power.

In one embodiment, while operational and exchanging data, a TD 103c may transmit information or be polled every 10 seconds, with transmissions from a BTR 102b to a central processing station 101 every 60 seconds. Other times may be employed, and transmission my not occur when, for example, the BTR 102b is stationary such as not in a moving vehicle, or alternately when the BTR 102b is in a vehicle that is garaged or otherwise parked at its storage location.

Figure 5:
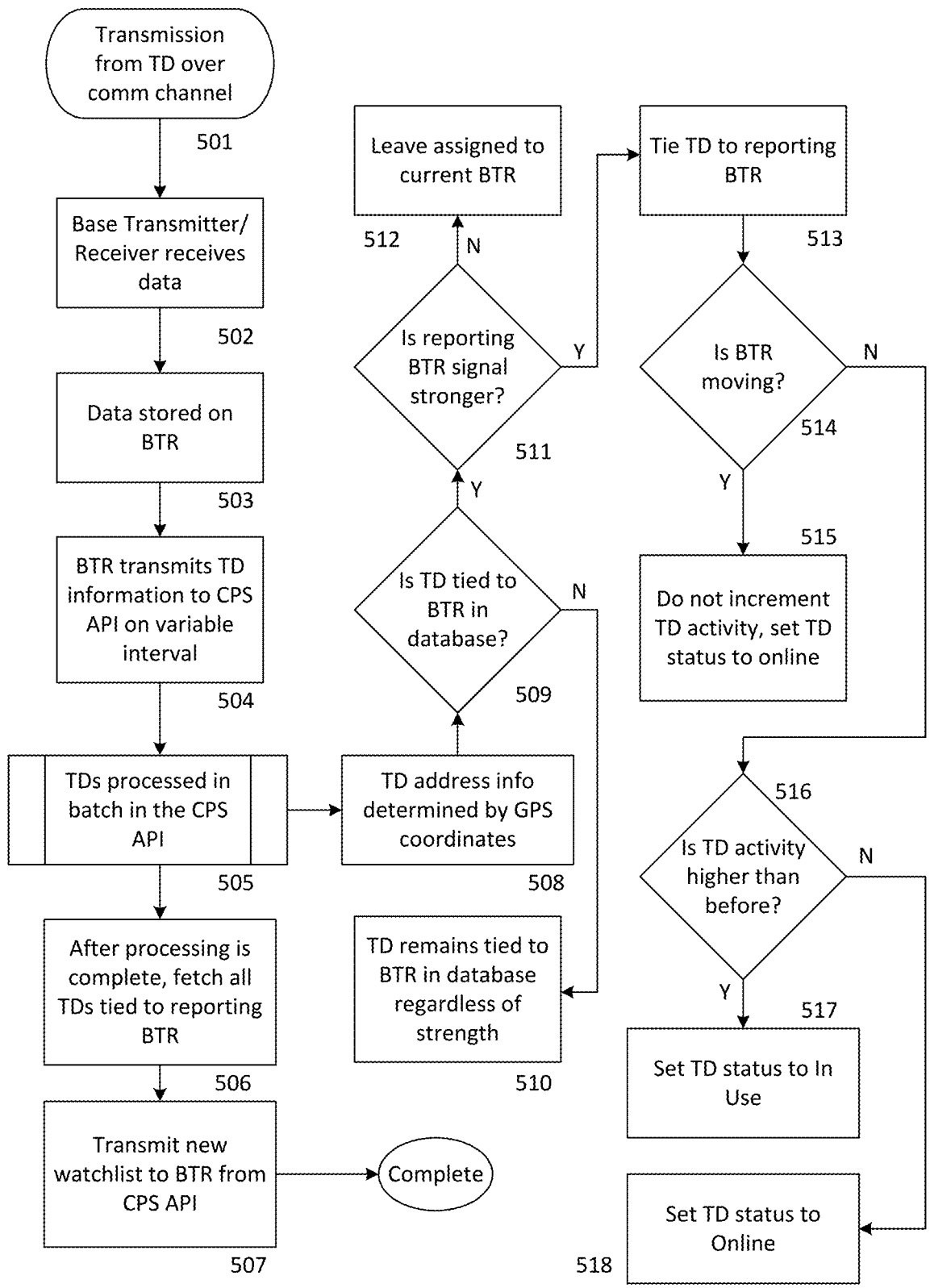
FIG. 5 shows one aspect of orchestration in the present system, specifically the processing, operation, and communication relevant to the interaction between a tracking device and a base transmitter/receiver.

Further, when the TD 103c is determined to be closer and/or has a stronger connection with one base transmitter than another that it had been connected to, the system may enable the switching of BTRs. In the present design, one embodiment calls for the TD 103c to transmit when the accelerometer senses movement indicating presence in a moving vehicle, such as with constant regular movement in a particular nonzero or nonresting accelerometer range. Such movement after resting can provide information about accelerometer readings to the BTR 102b. The presence of movement based on accelerometer readings may cause the BTR 102b to either alert an authorized user, such as a driver, that a TD and associated tracked item is missing, or the BTR 102b may provide such information to central processing station 101 that may notify authorized personnel electronically, such as by providing an alert to a computing device such as a smartphone. In this instance, vehicle personnel may be alerted when, for example, a tracked hardware item has been left behind or separated from the BTR 102b and the vehicle is leaving or has left the job site based on accelerometer readings indicating movement of the associated vehicle The entirety of this judicious operation is referred to herein as orchestration. Orchestration may include various time and power saving efficiencies with respect to communication between the various components in the system shown in FIG. 1. FIG. 5 shows one aspect of the orchestration and specifically the processing, operation, and communication relevant to the interaction between a TD 103c and a BTR 102b.

Point 501 in this embodiment calls for transmission from the TD 103c to the BTR 102b over the desired communication network. The system may initiate this command when the BTR 102b has data available, such as a time period after accelerometers are at a zero reading, an/or at a time when the vehicle transporting the tools begins to move, indicating the job has completed and all tracked hardware tools are available. Point 502 calls for the BTR 102b to receive the data, which is accelerometer data collected at the TD 103c over a period of time. Data collection may be memory dependent, i.e., hours of accelerometer data may not be available, but in one embodiment at least 30 minutes of accelerometer data may be collected at a TD. Point 503 calls for storing the accelerometer data, such as on a BTR watchlist in a storage device, such as a hardware storage element, in or associated with the BTR 102b. Point 504 calls for the BTR 102b to transmit TD information, such as identity of the TD, to the central processing station 101, or CPS, at a variable or regular interval, which may vary. Timing and execution of commands for passing data from a BTR 102b to the central processing station 101 may be controlled by the central processing station. Point 505 indicates data is transmitted from BTR 102b to the API at the central processing station, and the system typically processes each TD, one at a time.

Point 508 calls for the CPS to determine TD 103c address information based on GPS coordinates. Point 509 asks whether the TD 103c is tied to a BTR already in the database. If not, point 510 establishes the TD 103c is tied to the BTR in the database irrespective of signal strength. Point 511 determines whether the BTR signal is stronger than the signal from the current BTR, and if not, point 512 calls for leaving the TD 103c assigned to the current BTR. If the reporting BTR signal is stronger, point 513 calls for switching BTRs from the current BTR to the reporting BTR, tying or associating the TD 103c to the reporting BTR. Point 514 evaluates whether the BTR is moving, and if so, the system does not increment TD 103c activity and sets TD 103c activity to online at point 515. If the BTR is not moving, point 516 determines whether the TD activity is higher than before. If activity is higher, point 517 sets the TD status to In Use, and if not, sets TD status to online at point 518. If any of points 510, 512, 515, 517, or 518 execute, the system returns to point 505 and processes the next TD.

Once all TDs have been processed, point 506 calls for fetching all TDs tied to the reporting BTR, point 507 transmits the new watchlist, representing watched TDs, back to the BTR. Such transmission occurs from the CPS API (application programming interface) to each relevant BTR 102b.

Figure 6:
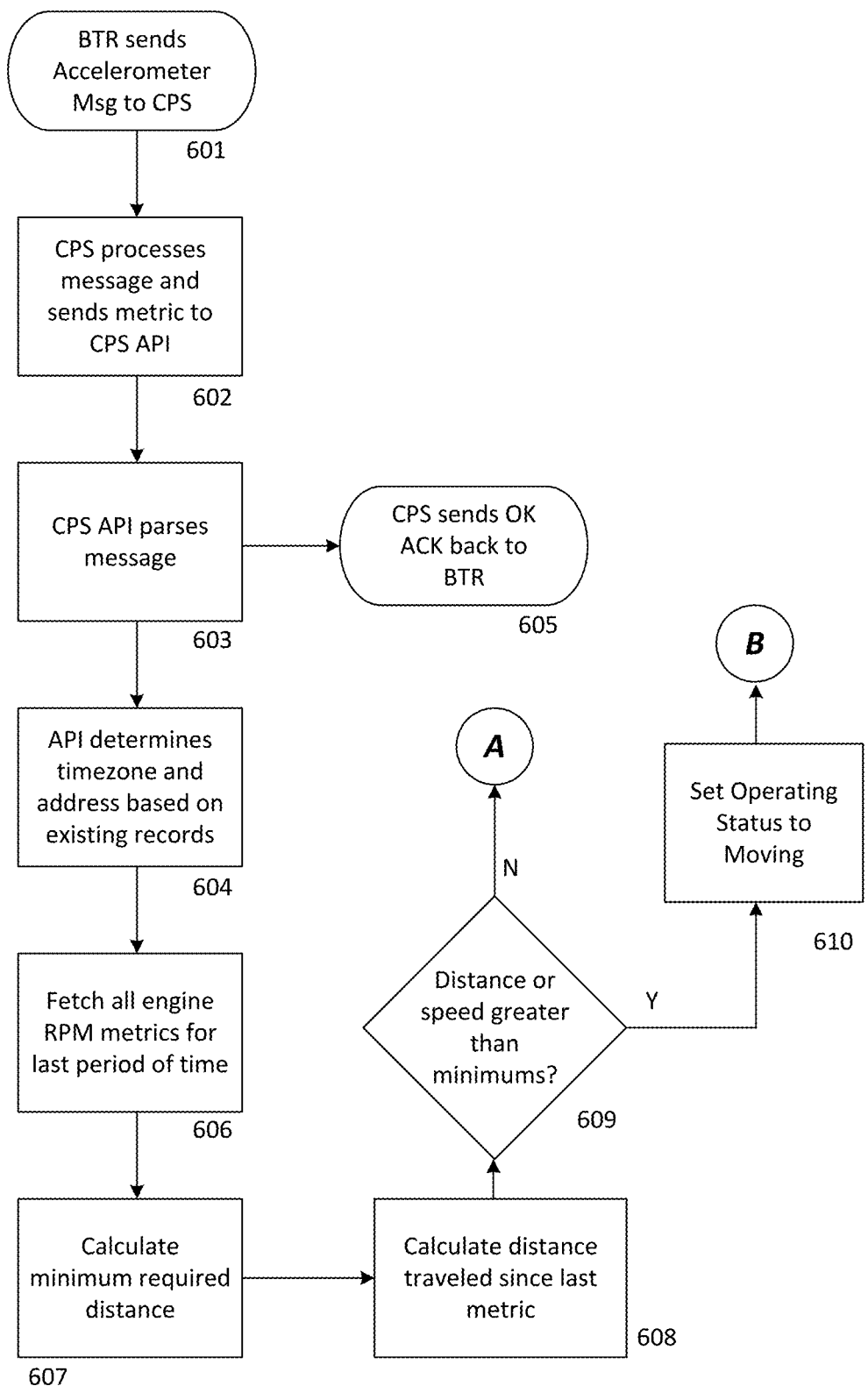
FIG. 6 illustrates a first aspect of accelerometer and operating status logic.
Figure 7:
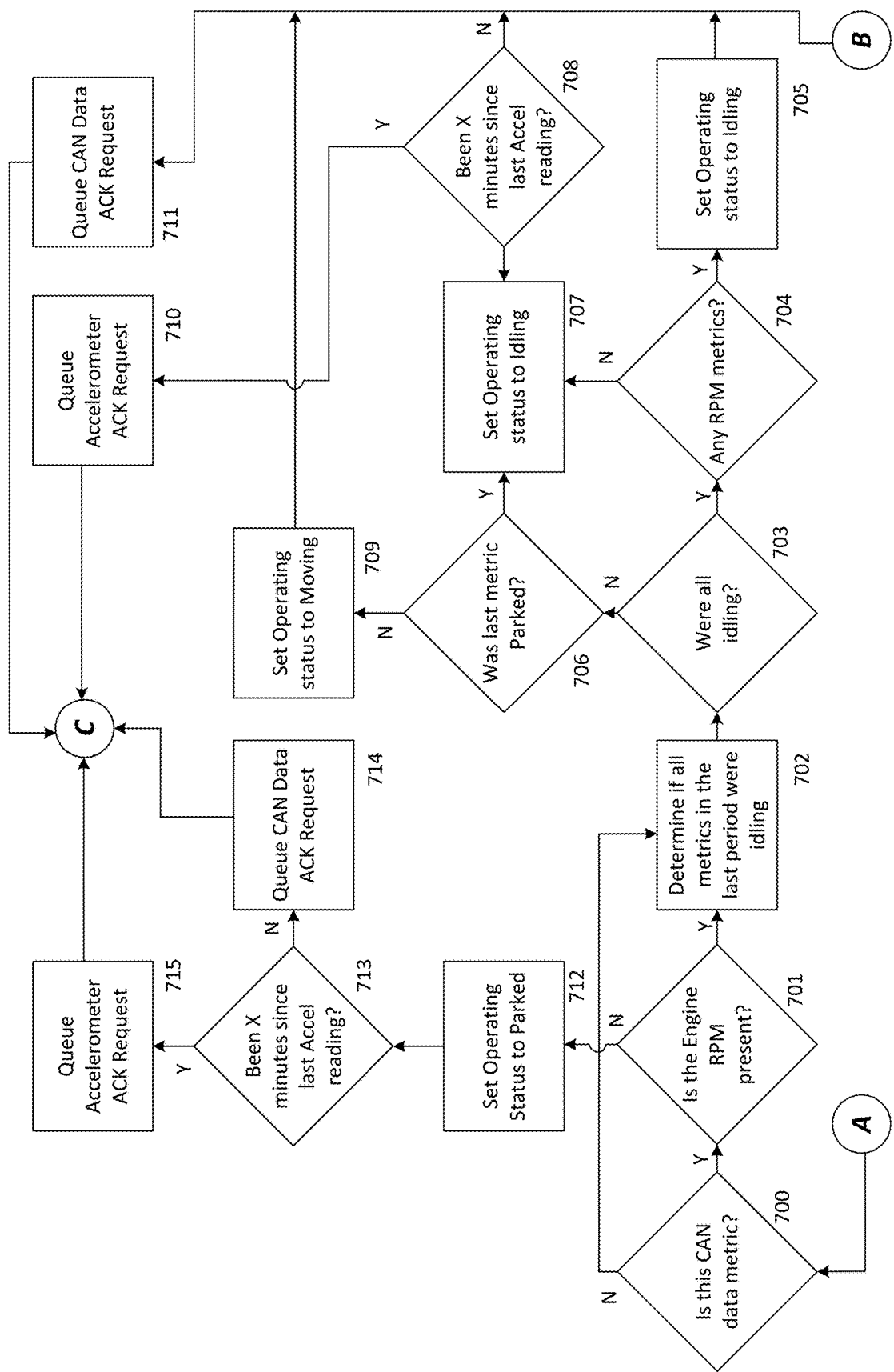
FIG. 7 shows a second aspect of accelerometer and operating status logic.
Figure 8:
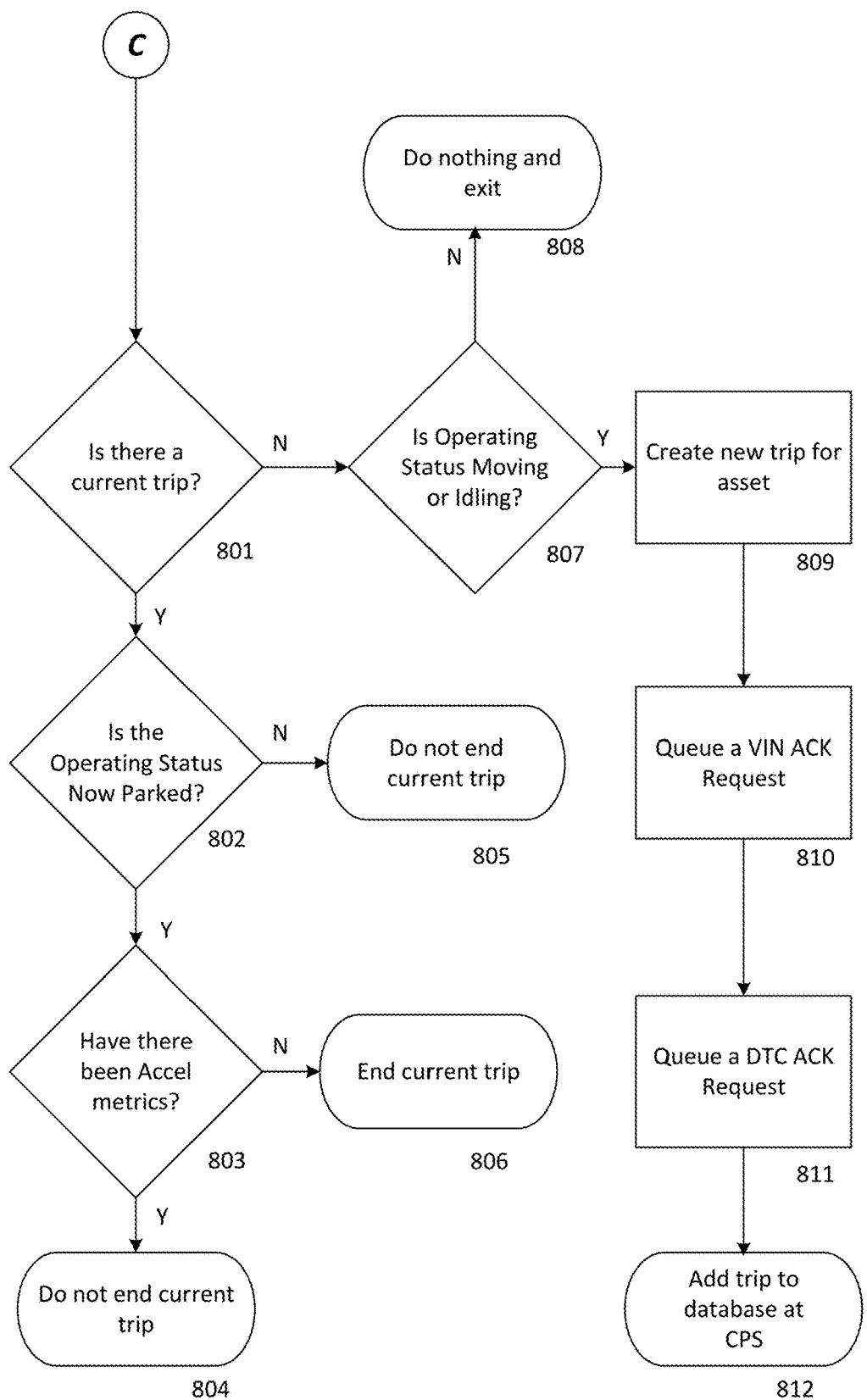
FIG. 8 is a third aspect of accelerometer and operating status logic.

FIGS. 6 through 8 illustrate accelerometer and operating status logic for the system. FIG. 6 shows the BTR 102b sending an accelerometer data request to a TD 103c at point 601. Point 602 indicates the TD 103c receives and parses the message and sends its accelerometer metric to the BTR 102b. Accelerometer metric can be any measure reflecting the current or recent accelerometer reading. Point 603 calls for the BTR 102b to parse the message received. Point 604 calls for the system, which may include central processing station 101 or BTR 102b, to determine the time zone and address based on GPS coordinates of the TD 103c. Point 606 calls for determining engine metrics for a period of time when the TD 103c is being transported. Engine metrics provide expected values when a vehicle is moving, including idling, accelerating, going up and down hills, and so forth. The system employs the combination of GPS data and accelerometer data to determine expected vehicle metrics and establishes a rage to determine when the vehicle is moving, idling, and stopped.

Point 607 calls for determining a required minimum distance, representing an amount of distance the vehicle travels to be considered moving or in transit. The distance traveled is based on accelerometer readings, time between measurements, and distance traveled where the minimum is assessed over a period of time. Point 608 calls for determining the distance traveled since the last accelerometer metric transmitted by TD 103c. At point 609, the system determines either whether the minimum distance has been passed or speed is greater than a certain value, such as five miles per hour. If so point 610 calls for setting the operating status to moving, indicating the vehicle and components therein are in transit and accelerometer readings do not indicate use of the associated tracked hardware items.

The flowchart of FIG. 7 illustrates determining whether the vehicle is parked, idling, or moving. FIG. 7 shows that when point 609 indicates no, the required minimum distance has not been achieved or the components are travelling at less than a certain speed, point 700 determines whether the metric is a CAN (Controller Area Network) metric, i.e., a metric retrieved from an asset such as a deployed or known vehicle. Point 701 assesses whether the engine RPM is present based on accelerometer readings. If so, the vehicle may simply be idling. Point 702 determines whether all metrics, for all devices on the vehicle, were idling for a predetermined amount of time, such as five minutes. Point 703 evaluates whether all devices indicate idling. If so, point 704 determines whether there were engine movement metrics, such as the engine operating at a certain RPM level. If so, at point 705, the system sets the operating status to Idle. If not, point 707 calls for setting the operating status to Parked. If, at point 703, the metrics indicate all metrics were not idling for the predetermined time period, such as five minutes, the system assesses whether the last metric was Parked. If so, the system retains the operating status as parked at point 707. If not, the system sets operating status to Moving. Point 708, where operating status is Parked, determines whether it has been a certain time since receiving accelerometer reading(s). If so, point 710 calls foe queueing the Accelerometer ACK (acknowledgement) request. Otherwise, and in the case of operating status being Moving (point 610), idling (point 705), or moving (point 709), the system queues a CAN data ACK request at point 711.

A CAN message requests data from, for example, a vehicle (speed, odometer reading, engine RPM, and so forth) that the system sends more frequently when a vehicle is moving. When the central processing station receives a CAN message, the logic illustrated determines status of the vehicle, such as idling, moving, and so forth.

If at point 701 the engine RPMs are not present, either based on vibration or an electronic indication of engine operation, for example, operation proceeds from point 701 to point 712, where the system sets operating status to Parked. At point 713, the system determines whether a time period has passed since the last accelerometer data has been received, and if that time has not been achieved, point 714 calls for queueing a CAN data ACK request. Point 715 represents the situation where the time since accelerometer readings received has been achieved, such as three or five minutes, and results in point 715 queueing an accelerometer ACK request. Thus points 715 and 710 are similar, while points 714 and 711 are also similar and represent the queueing of either and accelerometer acknowledgement or a CAN data acknowledgement.

FIG. 8 represents logic addressing the current trip. Again, the depictions in FIGS. 6 through 8 illustrate operation determining whether the components, such as TD 103c and BTR 102b, when on a vehicle are in use, sitting idle, or in transit. When in transit, FIG. 8 registers the operation as a trip, and from point 801, the system determines if there is a current trip, based on times of readings and indications received from accelerometers and previous readings. If there is a current trip, point 802 determines whether the operating status is Parked. If not, the trip has not ended and the system does not consider the current trip ended as shown at point 805. If status is Parked, the system assesses whether accelerometer metrics have been received, and if not, the system ends the current trip as shown at point 806. If there have been accelerometer metrics received and status is Parked, the system does not end the current trip as shown in point 804.

If the system determines at point 801 that there is not a current trip, point 807 evaluates whether the operating status is Moving or Idling. If not, point 808 calls for taking no action and exiting the logic. Point 809, representing the state where operating status is Moving or Idling, calls for creating a new trip for the associated devices. Point 810 queues an identification ACK request, such as a VIN or other vehicle identifier. Point 811 calls for a DTC ACK request, and point 812 adds the trip to the database maintained on the system, such as at central processing station 101.

In the present arrangement, the system can determine the actual usage of a tracked hardware device, such as a tool or implement, and differentiate from merely riding in a vehicle, sitting in a vehicle and not being used, and use of the implement or device. This information, gathered at the central processing station, can then be used to update authorized personnel or entities on use of the tracked hardware device. Further, the system does not need to be always operating. For example, if vehicle status is Parked, data may not be sent as frequently to the central processing station 101. If the vehicle is Moving, only location data may be transmitted, and accelerometers may not be polled as frequently. Attributes can be changed as desired. The end result is an efficient tracking of use and location of tracked hardware devices.

The present design may further accumulate and report usage for any and every tracked hardware item. In one typical scenario, a vehicle may be housed in a garage or outdoors. Tools may or may not be housed proximate the vehicle. A user or authorized entity may provide tracked hardware devices with TDs to the vehicle and may have an assigned task. The vehicle may then include at least one BTR 102*b* and at least one TD. The system may be initiated in any reasonable way, including the user or authorized entity indicating the vehicle will be going to the assigned task to central processing station 101 and central processing station 101 transmitting to transmitter/receiver 102*b* a wake up indication, or alternately the BTR 102*b* may be operating at a low level, simply taking accelerometer readings at a low rate, and may sense movement when the truck begins driving. Alternately, the BTR 102*b* may be provided with a hardware or software switch that the user or authorized entity may engage, turning on tracking functionality.

Once the BTR 102*b* has been engaged or awakened, the BTR may assess tracked hardware devices in range by polling all TDs in range. Each TD may be provided with a code or number, and information regarding each TD collected may be transmitted from BTR 102*b* to central processing station 101. Central processing station 101 may record identities of the base transmitter receiver and its association with each relevant TD, including identity of each TD.

The system listens for relevant information, primarily employing APIs at the central processing station wherein the messages are transmitted from a BTR 102*b*. Various types of messages may be received, including POST (power on self test), GPS, CAN, Accelerometer, GPS Status, ADC (Automatic Device Configuration), VIN (Vehicle Identification Number), Confirmation, Identification, and CAN Trigger.

POST processing evaluates whether firmware is up to date, and if so, simply acknowledges receipt of the message, as do all other modes in some manner indicating the completion of processing. If firmware is not up to date, POST message processing causes entry into bootloader mode and the updating of the firmware. GPS processing receives and provides GPS information received from the base station/transmitter. CAN messages include status and performance of the vehicle in question such as a truck and collects all relevant data, while Accelerometer reads accelerometer information in the message transmitted from the BTR 102*b* and optionally from at least one TD 103*c*. GPS status provides the GPS status, where the GPS status is typically binary, i.e. functioning or not functioning. ADC reads device voltage to understand device health, while VIN message functionality associates and registers an asset, such as a vehicle, according to its vehicle identification number and provides a name for the asset. If an asset is assigned a VIN, the system authenticates the association. Confirmation determines and confirms status of the vehicle, targeted to the vehicle being at rest such as for an extended period of time. Once confirmed, the system decreases polling and communications to a low rate, such as once per hour. Identification simply calls for reading identification information, identifying the transmitter transmitting the message. Finally, CAN Trigger determines whether the asset has a Controller Area Network (CAN) Trigger, triggering the collection of asset data, and if so, the ignition status may be on, off, or unknown. If on or off, the system creates a broadcast CAN message with the appropriate ignition status. If unknown, the system queues CAN data for ignition.

Thus according to the present design, based on the message received, the system may orchestrate operation, updating, passing of data, and power usage based on status of the assets and situations encountered. In the present design, if a vehicle fails for some reason, such as failure of a generator that powers a BTR, a repair call may be made or an alternate vehicle in the vicinity may be deployed to the site based on commands from the central processing station 101. The BTR on a secondary vehicle may be used to assess status of TDs and tracked items. Actual usage of the tracked items may be logged and the use of such items collected and maintenance schedules efficiently employed. In operation, the TD typically does not define when it is active or collecting or transmitting data, that information is maintained and coordinated by the BTR 102*b* in conjunction with central processing station 101.

The present design coordinates between three levels of devices to monitor status of tracked items based on presence of such items with an asset, such as a vehicle, monitoring vehicle status and location, and using messaging to intelligently monitor location and use of the tracked devices. In this manner, the actual usage of each device can be tracked and reported to authorized personnel, with a number of advantageous attributes, including ability to determine when a tracked device has gone missing and noting and addressing failures of any of the components. The present design also allows for switching to low power mode under certain circumstances and switching out of low power mode when necessary. The three components include the central processing station 101, BTR 102*b* including an accelerometer, and TD 103*c* also including an accelerometer.

As noted, the TD may actively transmit or may only respond or provide information when polled by the associated BTR. Typical functionality may include the BTR collecting the data when appropriate, but alternate functionality, such as the TD periodically transmitting, may be employed.

The following is an example of actual operation. The vehicle may then begin a trip to a destination such as a job site. Processing occurs as shown in FIGS. 6 through 15, with minimal communications needed while the vehicle is in transit. The user or authorized individual may stop at stop lights, may stop to pick up materials, may get food, for example, but the system senses these stops and evaluates as shown in FIGS. 6 through 15, and if the system senses further movement based on accelerometer readings, determines the vehicle is again or still in transit and does not poll or report accelerometer data. Once the vehicle reaches its destination, accelerometers provide negligible readings and the BTR and thus the BTR senses after a period of time that it is at rest. The BTR may then decrease the sensing and/or reporting of GPS location and may increase polling and/or data collection from TDs to determine those tracked devices that are removed or taken out of range. The BTR may increase reporting information to central processing station 101 or may provide an initial period of increased reporting followed by a lower period of reporting, i.e., when the tool or tracked device is in use. However, as tools may be taken from and returned during a task, such functionality may not be employed.

Once the tracked devices are all collectively returned to the range of the BTR, the BTR may poll and determine tracked devices have been returned and may collect, where appropriate, usage (accelerometer) statistics for the tracked devices that had been removed. The BTR does not need to poll, for example, tracked devices that have not moved since the BTR has stopped. Such polling may be triggered by movement of the vehicle/BTR or upon sensing accelerometer readings indicating idling or movement of the vehicle. The BTR may then transmit use information for the various tracked devices to central processing station 101 and may alter functionality based on a return trip being initiated. In one aspect, the vehicle may simply be transitioning to another work site and the process may be sensed and the functionality outlined above may repeat. Eventually, once the vehicle returns to a storage area, data may be transmitted from TDs to the BTR and to the central processing station. When no further tracking is required, such at the end of the day, the system may turn off the BTR electronically or via remote command or appropriate personnel may manually turn off the device.

The foregoing system may assist in locating misplaced items. When, for example, multiple tracked devices are returned to the range of the BTR and the vehicle idles or begins moving, the BTR may poll TDs, and if any registered TDs are missing, appropriate personnel may be alerted to the absence of the missing tracked item, such as by notification via the central processing station. Geofencing may be used, triggering notifications, tracking, or other functionality when a BTR passes through a geofence. For example, when a vehicle leaves a "home" area, crossing a geofence, the BTR 102b may assess presence of TDs within range, and may trigger a further inventory when the vehicle crosses back into the "home" area. In this manner, the system can match tracked devices coming in against tracked devices that went out and assess total time each tracked device has been used at an end of the day if not already available.

Thus according to one embodiment, there is provided a system for tracking a tracked device, comprising a tracking device comprising a tracking device accelerometer, the tracking device associated with the tracked device and a base transmitter/receiver comprising a base transmitter/receiver accelerometer and configured to poll and receive tracking device accelerometer data from the tracking device. The base transmitter/receiver is associated with and transportable by a movable vehicle and the tracking device and tracked device are positionable within the movable vehicle. Communication between the base transmitter/receiver and tracking device changes frequency based on movement of the movable vehicle when the base transmitter/receiver and the tracking device are located in the movable vehicle.

According to a further embodiment of the present design, there is provided a system comprising a tracking device comprising a tracking device accelerometer, the tracking device associated with a tracked hardware device and a base transmitter/receiver comprising a base transmitter/receiver accelerometer and configured to poll and receive tracking device accelerometer data from the tracking device. The base transmitter/receiver is associated with and transportable by a movable vehicle and the tracking device and tracked device are positionable within the movable vehicle. Differences in movements of the movable vehicle when housing the base transmitter/receiver, the tracking device, and the tracked hardware device produce communication functionality differences between the base transmitter/receiver and the tracking device.

According to a further embodiment, there is provided a tracking system comprising a tracking device comprising a tracking device accelerometer, the tracking device associated with a tracked hardware device, and a base transmitter/receiver comprising a base transmitter/receiver accelerometer and configured to poll and receive tracking device accelerometer data from the tracking device. The base transmitter/receiver is associated with and transportable by a vehicle and the tracking device and tracked device are positionable within the vehicle. Differences in movements of the vehicle when housing the base transmitter/receiver, the tracking device, and the tracked hardware device result in differences in at least one of frequency and content of communications between the base transmitter/receiver and the tracking device.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A system for tracking a tracked device, comprising:
  a tracking device comprising a tracking device accelerometer, the tracking device associated with the tracked device; and
  a base transmitter/receiver comprising a base transmitter/receiver accelerometer and configured to poll and receive tracking device accelerometer data from the tracking device;
  wherein the base transmitter/receiver is associated with and transportable by a movable vehicle and the tracking device and tracked device are positionable within the movable vehicle;
  wherein periodicity of communication between the base transmitter/receiver and tracking device changes based on movement of the movable vehicle when the base transmitter/receiver and the tracking device are located in the movable vehicle;
  wherein the tracking device is movable out of communication range with the base transmitter/receiver, and the base transmitter/receiver collects usage data based on tracking device accelerometer readings once the tracking device returns to a location within range of the base transmitter/receiver.

2. The system of claim 1, further comprising a central processing station configured to poll and receive information from the base transmitter/receiver.

3. The system of claim 2, wherein the central processing station receives tracking device usage data from multiple base transmitter/receivers and electronically communicates relevant base transmitter/receiver and tracking device data to authorized personnel.

4. The system of claim 1, wherein the base transmitter/receiver collects tracking device accelerometer data from the tracking device usable to determine an amount of time the tracked device has been in use.

5. The system of claim 1, wherein the base transmitter/receiver is associated with multiple tracking devices and polls and collects available tracking device accelerometer data from the multiple tracking devices to determine tracked device usage multiple tracked devices.

6. The system of claim 1, wherein the base transmitter/receiver collects data from the tracking device more frequently when the movable vehicle has recently attained a stationary position.

7. The system of claim 1, wherein the tracking device collects but refrains from providing tracking device accelerometer readings to the base transmitter/receiver when out of communication range from the base transmitter/receiver.

8. The system of claim 1, wherein the communication channel between the base transmitter/receiver and the tracking device is inconstant.

9. A system comprising:
a tracking device comprising a tracking device accelerometer, the tracking device associated with a tracked hardware device; and
a base transmitter/receiver comprising a base transmitter/receiver accelerometer and configured to poll and receive tracking device accelerometer data from the tracking device;
wherein the base transmitter/receiver is associated with and transportable by a movable vehicle and the tracking device and tracked device are positionable within the movable vehicle;
wherein differences in movements of the movable vehicle when housing the base transmitter/receiver, the tracking device, and the tracked hardware device produce communication functionality differences between the base transmitter/receiver and the tracking device;
wherein the tracking device is movable out of communication range with the base transmitter/receiver, and the base transmitter/receiver collects usage data based on tracking device accelerometer readings once the tracking device returns to a location within range of the base transmitter/receiver.

10. The system of claim 9, wherein the communication functionality differences comprise differences in communication periodicity.

11. The system of claim 10, wherein the central processing station receives tracking device usage data from multiple base transmitter/receivers and electronically communicates relevant base transmitter/receiver and tracking device data to authorized personnel.

12. The system of claim 9, further comprising a central processing station configured to poll the base transmitter/receiver and receive and process base transmitter/receiver and tracking device data.

13. The system of claim 9, wherein the base transmitter/receiver collects tracking device accelerometer data from the tracking device usable to determine an amount of time the tracked device has been in use.

14. The system of claim 9, wherein the base transmitter/receiver is associated with multiple tracking devices and polls and collects available tracking device accelerometer data from the multiple tracking devices to determine tracked device usage for multiple tracked devices.

15. A tracking system comprising:
a tracking device comprising a tracking device accelerometer, the tracking device associated with a tracked hardware device; and
a base transmitter/receiver comprising a base transmitter/receiver accelerometer and configured to poll and receive tracking device accelerometer data from the tracking device;
wherein the base transmitter/receiver is associated with and transportable by a vehicle and the tracking device and tracked device are positionable within the vehicle;
wherein differences in movements of the vehicle when housing the base transmitter/receiver, the tracking device, and the tracked hardware device result in differences in at least one of periodicity and content of communications between the base transmitter/receiver and the tracking device;
wherein the tracking device is movable out of communication range with the base transmitter/receiver, and the base transmitter/receiver collects usage data based on tracking device accelerometer readings once the tracking device returns to a location within range of the base transmitter/receiver.

16. The tracking system of claim 15, further comprising a central processing station configured to poll the base transmitter/receiver and receive and process base transmitter/receiver and tracking device data.

17. The tracking system of claim 16, wherein the central processing station receives tracking device usage data from multiple base transmitter/receivers electronically communicates relevant base transmitter/receiver and tracking device data to authorized personnel.

18. The tracking system of claim 16, wherein the tracking device collects but refrains from providing tracking device accelerometer data to the base transmitter/receiver when the tracking device is out of communication range from the base transmitter/receiver.

19. The tracking system of claim 15, wherein the base transmitter/receiver collects tracking device accelerometer data from the tracking device usable to determine an amount of time the tracked device has been in use.

20. The tracking system of claim 15, wherein the base transmitter/receiver is associated with multiple tracking devices and polls and collects available tracking device accelerometer data from the multiple tracking devices to determine tracked device usage for multiple tracked devices.

* * * * *